(No Model.)
T. A. EDISON.
APPARATUS FOR THE ELECTRICAL TRANSMISSION OF POWER.
No. 265,786. Patented Oct. 10, 1882.
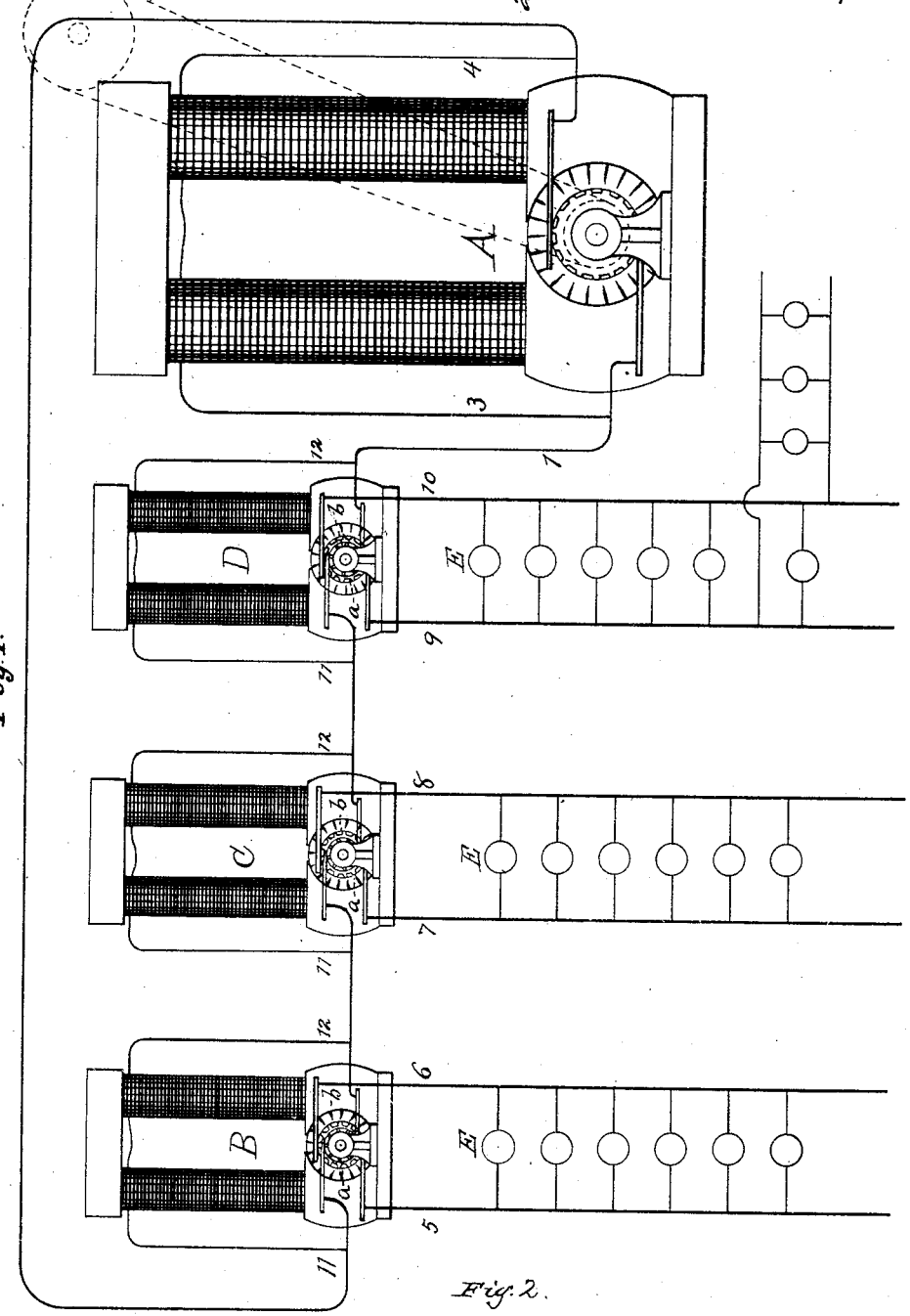
Fig. 1.
Fig. 2.
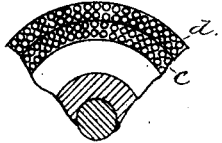
WITNESSES:
E. C. Rowland
V. H. W. Seely
INVENTOR:
T. A. Edison
BY Rich^d N. Dyer,
ATTORNEY.

UNITED STATES PATENT OFFICE.

THOMAS A. EDISON, OF MENLO PARK, NEW JERSEY.

APPARATUS FOR THE ELECTRICAL TRANSMISSION OF POWER.

SPECIFICATION forming part of Letters Patent No. 265,786, dated October 10, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Apparatus for the Electrical Transmission of Power, (Case No. 423;) and I do hereby declare that the following is a full and exact description of the same, reference being had to the accompanying drawings, and to the letters of reference marked thereon.

The object I have in view is to produce simple and efficient means for transmitting power electrically without a large investment in conductors, and for supplying independent translating devices with electric current of lower tension than that flowing in the main circuit. This I accomplish by supplying a main circuit with a continuous current of high tension by means of one or a number of dynamo or magneto electric machines, and by arranging in series in this main circuit two or more combined electro-dynamic motors and dynamo-electric generators, each of which has two sets of coils upon its armature, connected with independent commutators. The brushes of one commutator are connected with the conductors of the main circuit, while those of the other commutator are connected with conductors with which lamps, motors, or other translating devices are connected in multiple-arc circuits. Each set of coils is a continuous winding upon a cylinder or ring, (the Siemens or Gramme winding,) and one set is connected with the bars of its commutator-cylinder, so as to form with the common field-magnet a complete motor or generator. A continuous current being passed through either set of armature-coils and through the field-coils, the armature will be revolved and the other set of coils will generate a continuous current by cutting the lines of force. One set of coils is in no sense secondary to the other, since they may correspond in resistance and the electro-motive force of the generating-coils be the same as the drop caused by the motor-coils. The field-circuit of each of these machines is a multiple-arc circuit from the main circuit or from its own lamp-circuit. Thus it will be seen that each of these machines will be both a motor and a generator. The tension of the current in the main circuit is much higher than that of the current in each lamp-circuit, and since the combined motors and generators will be located at or near the points of consumption, a great saving in conductors can be made, since the conductors of the main circuit (the only one that need be of any considerable length) can be small. Each combined motor and generator can be regulated independently to give the desired tension in the circuit supplied by it, so that the same tension can be maintained in all the lamp-circuits or a different tension maintained in the same, so as to supply half-lights, if required. Any one of the combined motors and generators can be short-circuited by closing a shunt around it, in which case the electro-motive force could be reduced at the source of supply.

In the accompanying drawings, forming a part hereof, Figure 1 is an arrangement embodying the invention shown diagrammatically, and Fig. 2 is a cross-section of a portion of the armature of one of the combined machines.

A represents a dynamo or magneto electric machine supplying a current of high tension in the main circuit 1 2; or a number of machines arranged in multiple arc, in series, or in multiple series could be used for the purpose. The field of the machine A is supplied by a multiple-arc circuit, 3 4, from 1 2, and the machine may be regulated in any known way, preferably by shifting the commutator-brushes or by varying primarily the strength of the field-magnet.

B C D represent machines which are combined electro-dynamic motors and dynamo-electric generators. Each machine has a cylindrical or annular armature-core wound with two sets of continuous coils connected to two independent bar-commutators, *a b*. The smaller commutator *a* is the motor-commutator, and the brushes resting upon it are connected with the conductors of the main circuit 1 2, while the larger commutator, *b*, is that of the generating-coils, and the brushes bearing on it have conductors connected with them, with which lamps or other translating devices, E, are connected in multiple arc. These conductors of the three machines are represented by 5 and 6, 7 and 8, and 9 and 10. The field-circuits 11 12 of the combined motors and generators are multiple-arc circuits from 1 2; or each machine may supply its own field from the current generated by it. In Fig. 2 the two sets of coils of each machine are shown. The inner or motor coils, c, are connected with the commutator a, while the outer or generating coils, d, are connected with the commutator b. Each of the combined motors and generators can be regulated independently of all others to give the desired tension of current in the translation-circuit supplied by it as a generator. This can be done by adjusting the brushes on either commutator or by varying primarily the strength of the field-magnet.

A shunt-circuit (not shown) may be formed around each machine B, C, and D, provided with a switch for making and breaking the same, so that any one of these machines can be cut out of circuit. If any machine were cut out of circuit, the electro-motive force at the source of supply would be reduced accordingly.

It will be understood, as before explained, that the independent windings of each combined machine are of the Siemens or Gramme pattern, while the field-magnet is common to both.

A continuous current is used to operate each machine, while the current generated by it is also continuous.

What I claim is—

1. The combination, with a main circuit having a current of high tension, of two or more combined electro-dynamic motors and dynamo-electric generators arranged in series as motors in such main circuit, and independent translation-circuits connected with the generating-coil of such machines and supplied thereby with currents of low tension, substantially as set forth.

2. The combination, with one or more dynamo or magneto electric machines supplying a main circuit with a current of high tension, of two or more combined electro-dynamic motors and dynamo-electric generators, each having two sets of armature-coils connected with two independent commutators, one set of commutator-brushes being in the line of the main circuit and the other set connected with conductors independent of the main circuit, and translating devices arranged in multiple-arc circuits from such independent conductors, substantially as set forth.

3. The combination, with the main circuit, having a current of high tension, of two or more combined electro-dynamic motors and dynamo-electric generators arranged in series as motors in the main circuit, and independent translation-circuits connected with the generating-coils of such machines and supplied thereby with currents of low tension, each of said combined machines being adapted for independent regulation, substantially as set forth.

4. The combination, with a main circuit, of two or more combined electro-dynamic motors and dynamo-electric generators arranged in series as motors in the main circuit, and independent translation-circuits supplied by such machines with currents of low tension, the coils of the field-magnet of each combined machine being in an independent circuit derived from the main circuit, substantially as set forth.

5. The combined electro-dynamic motor and dynamo-electric generator described, consisting of an armature having two independent continuous windings connected with separate bar-commutators, and a field magnet or magnets common to both windings, substantially as set forth.

This specification signed and witnessed this 22d day of May, 1882.

THOMAS A. EDISON.

Witnesses:
EDW. C. ROWLAND,
C. P. MOTT.